March 27, 1962 C. W. UPTON, JR., ET AL 3,027,439
HIGH SPEED ELECTRIC SWITCH
Filed Jan. 31, 1957 6 Sheets-Sheet 2
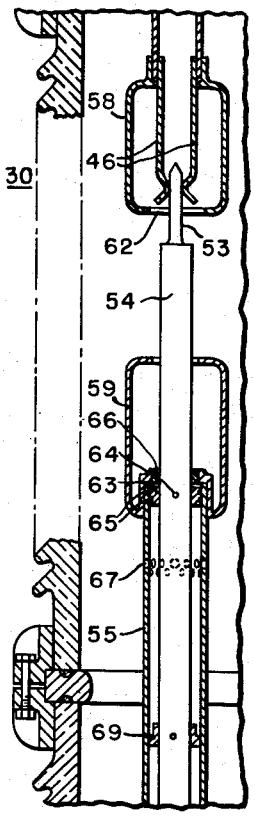
Fig. 4.
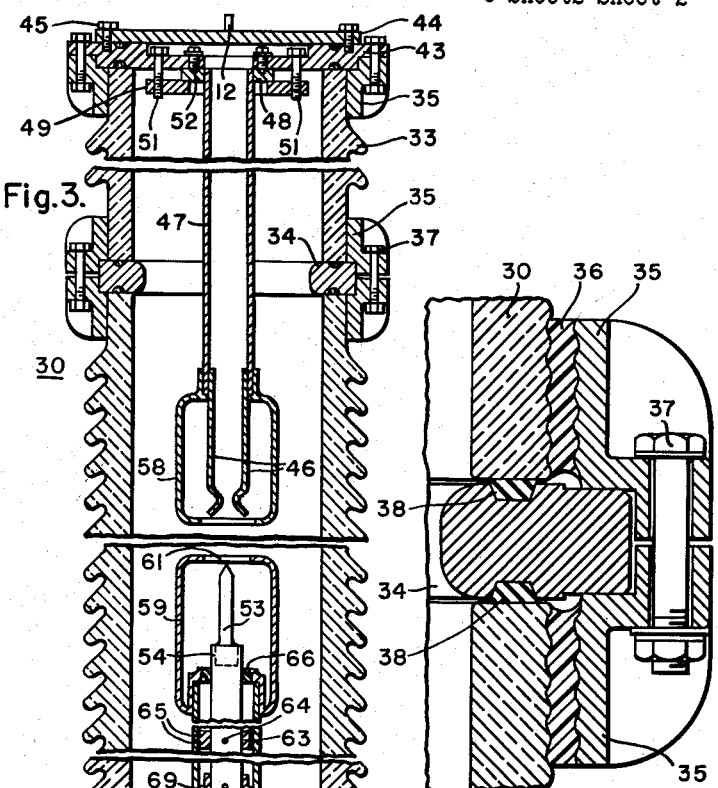
Fig. 3. Fig. 5.
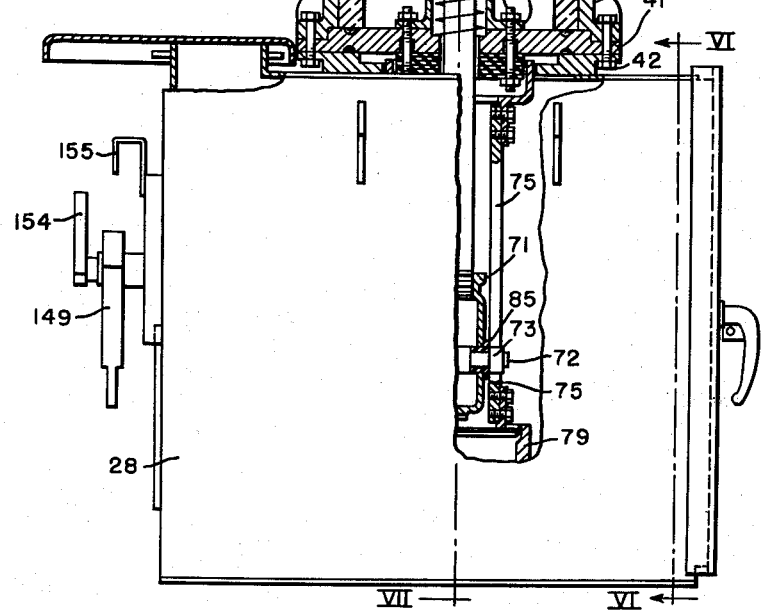

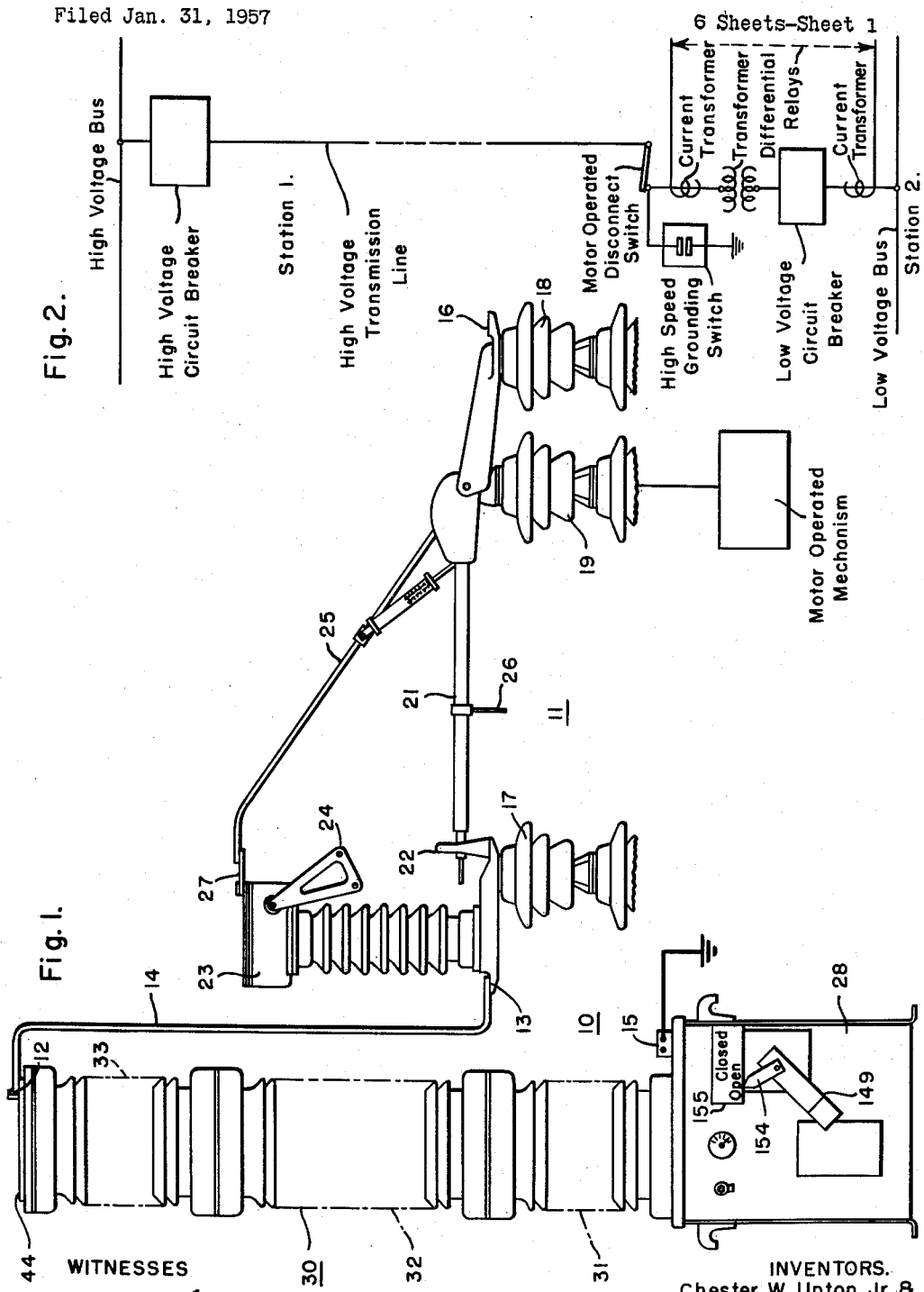

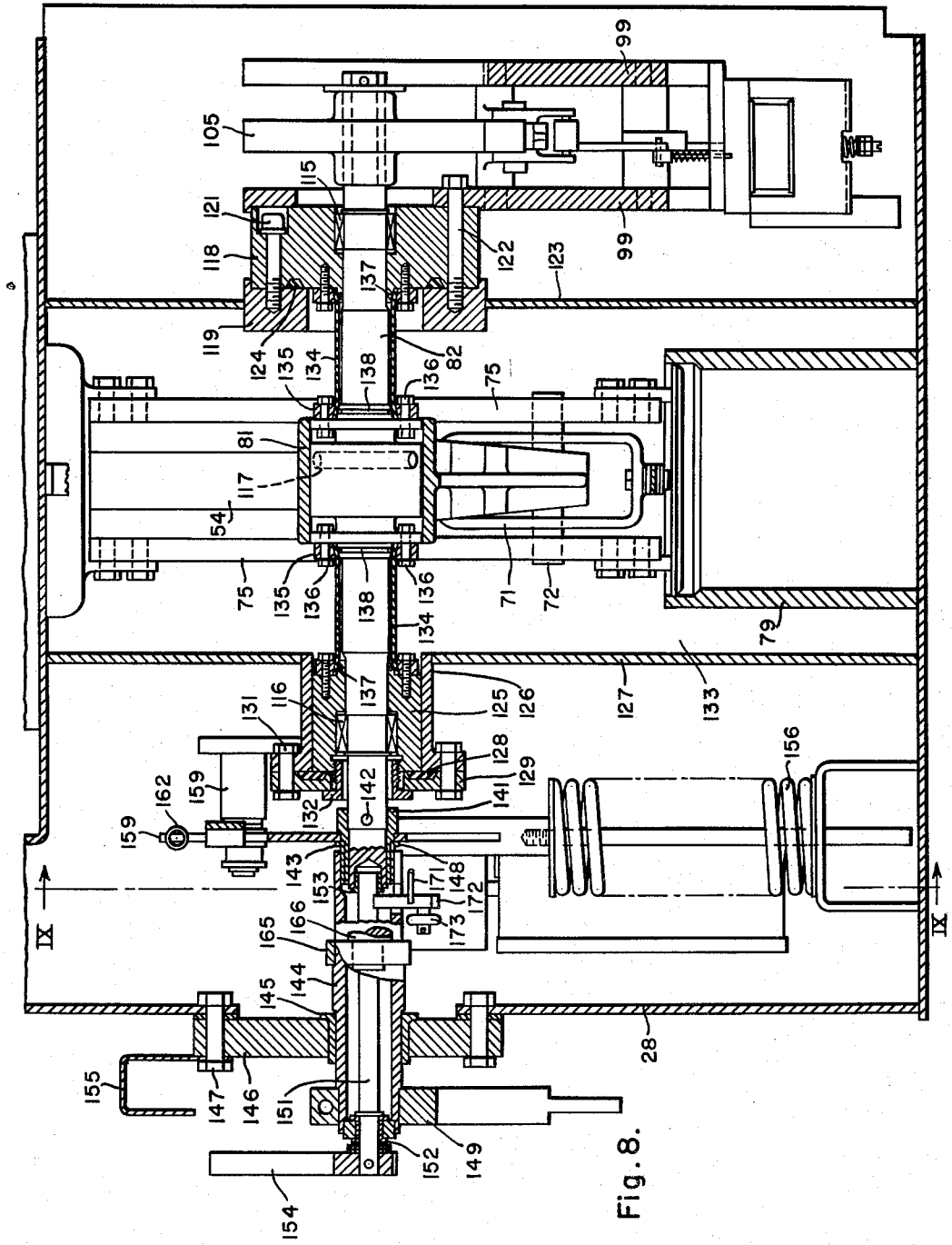

March 27, 1962  C. W. UPTON, JR., ET AL  3,027,439
HIGH SPEED ELECTRIC SWITCH
Filed Jan. 31, 1957  6 Sheets-Sheet 6

# United States Patent Office 3,027,439
Patented Mar. 27, 1962

3,027,439
HIGH SPEED ELECTRIC SWITCH
Chester W. Upton, Jr., Penn Township, Westmoreland County, and Earl F. Beach, Pittsburgh, Pa., assignors to Westinghouse Electric Corporation, East Pittsburgh, Pa., a corporation of Pennsylvania
Filed Jan. 31, 1957, Ser. No. 637,534
12 Claims. (Cl. 200—148)

Our invention relates, generally, to electric switches and, more particularly, to switches suitable for utilization as grounding switches.

Automatic grounding switches utilized on power systems are usually applied to protect transformers which are located remotely from a high-voltage circuit breaker. In the event of an internal fault in a transformer, the grounding switch amplifies the small internal fault to such a proportion that a remote circuit breaker supplying the transformer is tripped. The transformer fault circuit is not large enough to operate remote relays, but local differential relays can easily detect the trouble and operate the grounding switch to ground the power circuit, thereby operating the relays at the remote circuit breaker and tripping the breaker. Thus, the transformer is removed from service before it is damaged extensively.

Conventional automatic grounding switches which have been utilized previously have been of the swinging-blade type, requiring 15 to 30 cycles for operation. While the prior switches have generally been satisfactory, the advent of faster operating time for breakers and relays has made the conventional grounding switch with 15 to 30 cycles operating time obsolete for coordination with faster acting breakers and relays.

An object of our invention is to provide a high-voltage grounding switch capable of operating within five cycles.

Another object of our invention is to provide a high-speed grounding switch capable of closing a relatively high amperage.

A further object of our invention is to provide an enclosed high-voltage electric switch.

A still further object of our invention is to provide a grounding switch of the reciprocating type using a blade movable axially along its length.

A further object of our invention is to provide an anti-rebound mechanism for a high-speed grounding switch.

Still another object of our invention is to provide an enclosed high-voltage grounding switch which cooperates with an adjacent disconnect switch and a remote circuit breaker in protecting a power transformer.

Another object of our invention is to provide a resetting mechanism for a switch of the reciprocating type.

A further object of our invention is to provide for latching a spring-biased switch of the reciprocating type in the open and the closed positions.

Still another object of our invention is to provide a high-voltage grounding switch having normally open contact members spaced relatively closely together, thereby decreasing the time required to close the contact members.

Other objects of our invention will be explained fully hereinafter or will be apparent to those skilled in the art.

In accordance with one embodiment of our invention, a reciprocating contact member of a high-speed grounding switch is enclosed in a vertically disposed porcelain casing filled with sulphur hexafluoride gas under pressure. The contact member is biased toward the closed position by springs and latched in the open position by a latching mechanism. After closing, the switch may be reset by a combined anti-rebound and resetting mechanism which is actuated by a horizontally disposed manually rotatable shaft.

For a better understanding of the nature and objects of our invention, reference may be had to the following detailed description, taken in conjunction with the accompanying drawings, in which:

FIGURE 1 is a reduced view, in side elevation, of a switchgear structure in which a grounding switch constructed in accordance with our invention is utilized;

FIG. 2 is a single line diagram of a power distribution system in which the switchgear apparatus shown in FIG. 1 is utilized;

FIG. 3 is a view, partly in section and partly in side elevation, of a grounding switch embodying the principal features of our invention;

FIG. 4 is a view, in section, of a portion of the switch structure showing the contact members closed;

FIG. 5 is an enlarged detail view, in section, showing a joint between sections of the porcelain casing;

FIG. 8 is an enlarged view, in section, taken along the line VIII—VIII in FIG. 7;

Figure 6:
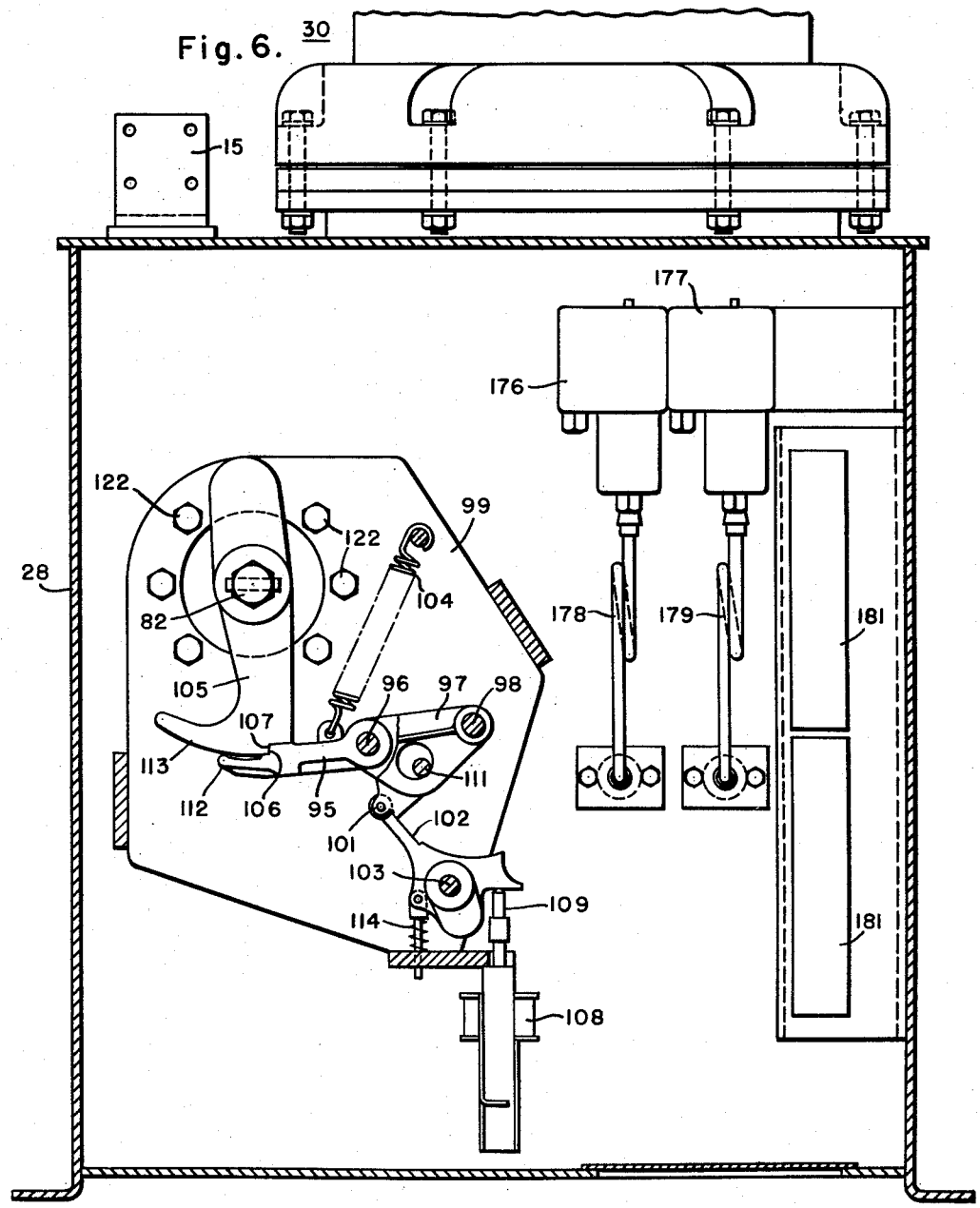
FIG. 6 is an enlarged view, partly in section and partly in elevation, the section being taken along the line VI—VI in FIG. 3 and showing the latching mechanism.

Referring to the drawings, and particularly to FIG. 1, the switchgear structure shown therein comprises a grounding switch 10 and a motor-operated disconnect switch 11. As shown, a terminal 12 of the grounding switch 10 is connected to one terminal 13 of the disconnect switch by means of a conductor 14. Another terminal 15 of the grounding switch 10 is connected to ground, and another terminal 16 of the disconnect switch may be connected to a high voltage transmission line.

As shown in FIG. 2, the grounding switch and the disconnect switch may be utilized in conjunction with a low-voltage circuit breaker and a high-voltage circuit breaker to protect a transformer which is located remotely from a high-voltage bus and the high-voltage circuit breaker. The utilization of the high-speed grounding switch and the disconnect switch make it unnecessary to provide a high-voltage circuit breaker at the high-tension side of the transformer, thereby effecting a saving in the total cost of the apparatus. In the event of a fault in the transformer windings, the differential relays open the low-voltage circuit breaker, thereby disconnecting the low-tension load from the transformer, and close the high-speed grounding switch, thereby connecting the transmission line to ground. This causes sufficient current to flow through the transmission line to operate the protective relays for the high-voltage circuit breaker which is opened to disconnect the transmission line from the high-voltage bus. In this manner, the transformer bank is prevented from being damaged by a high-impedance fault current which would not be of sufficient magnitude to cause opening of the high-voltage circuit breaker. As will be explained more fully hereinafter, the motor operated disconnect switch may, if desired, be utilized to protect the high-speed grounding switch against damage under certain conditions.

As mentioned previously, the disconnect switch 11 is preferably of the motor-operated type. The operating mechanism may be of the type described in Patent 2,669,622, issued February 16, 1954 to J. B. Owens and assigned to the Westinghouse Electric Corporation. As shown, the disconnect switch 11 is, for some applications, of the load-break type. If it is not considered necessary to provide a switch of the load-break type, the interrupter mechanism may be omitted and a disconnect switch of the usual type may be utilized. The disconnect switch illustrated may be of the type described in Patent 2,769,063, issued October 30, 1956 to H. J. Lingal and assigned to the Westinghouse Electric Corporation.

As shown, the switch 11 comprises two fixed insulator columns 17 and 18 and a rotatable insulator column 19. A blade 21 which is normally closed to engage a contact member 22 mounted on the insulator column 17 is actuated to the open position by rotating the insulator column 19 by means of the motor-operated mechanism.

A circuit interrupting device 23, which is fully described in the aforesaid patent to Lingal, is also supported by the insulator column 17. As described in the aforesaid Lingal patent, the blade 21 engages an operating crank 24 as the blade is being opened. The crank 24 causes operation of the interrupting device 23 to interrupt the circuit, thereby preventing an arc from being drawn between the blade 21 and the contact member 22. After the circuit is interrupted, an auxiliary blade 25 is engaged by an arm 26 on the blade 21 to disconnect the terminal 16 of the disconnect switch from the terminal 13.

During closing of the disconnect switch, the auxiliary blade 25 first engages a terminal 27 on the interrupting device 23, after which the crank 24 is operated by the blade 21 to close the circuit through the interrupting device. The blade 21 then engages the contact member 22 to shunt the circuit through the auxiliary blade 25 and the interrupting device 23. In this manner, the blade 21 is protected against arcing during both opening and closing of the switch.

As also shown in FIG. 1, the grounding switch 10 is of the enclosed type. It comprises a metal enclosure 28 upon which is mounted a cylindrical insulating casing 30 which in the present structure comprises three porcelain sections 31, 32 and 33. It will be understood that a different number of porcelain sections may be utilized. As previously stated, the upper terminal 12 of the switch which is mounted on the upper porcelain section 33 is connected to one terminal 13 of the disconnect switch. The lower terminal 15 of the grounding switch which is mounted on the enclosure 28 is connected to the ground.

In order to reduce the size of the grounding switch necessary for high voltage service and also to increase the speed of operation, the casing 30 and a portion of the enclosure 28 are filled with a gas having high dielectric strength such as sulphur hexafluoride ($SF_6$) gas. The utilization of $SF_6$ gas as an insulating medium because of its high dielectric strength, which is approximately two to three times that of air, is generally known. Other gases having dielectric strengths ranging approximately from 1.4 to 3 times that of air are bromotrifluoromethane ($CF_3Br$), perfluoropropane ($C_3F_8$), Freon 12 ($CCl_2F_2$), and selenium hexafluoride ($SeF_6$).

The properties of $SF_6$ gas when utilized as a circuit interrupting medium are set forth in Patent 2,757,261, issued July 31, 1956 to H. J. Lingal et al. and assigned to the Westinghouse Electric Corporation. However, to the best of our knowledge, no one has previously provided an electric switch in which the high dielectric strength and the arc extinguishing properties of $SF_6$ gas are both utilized to the best advantage. Thus, when the gas is utilized merely as an insulating medium, the problem of interrupting arcs is not involved. Likewise, when the gas is utilized in circuit breakers in which the contact members are normally closed, the high dielectric strength of the gas is not utilized while the contact members are closed and it functions as an interrupting medium only during opening of the contact members and interrupting of the arc drawn between the contact members.

In the present switch, the contact members are normally open. As previously explained, for high voltage service, for example, 196 kv. and above, the space required between the open contact members to prevent breakdown of air is so great that a switch of the previously utilized type having contact members separated by air becomes so excessive in size that high-speed operation is impossible. Therefore, by enclosing the contact members and maintaining a gas having a high dielectric strength under pressure in the enclosure, the contact members may be spaced relatively closely together, thereby permitting them to be closed in a relatively short time. The present switch is capable of being closed within five cycles from the time of energization of the closing coil.

Furthermore, by utilizing a gas, such as $SF_6$, which has arc extinguishing properties, arcing between the contact members during the closing operation is minimized. Thus, damage to the contact members during the closing operation is minimized and repetitive operations are permitted without it being necessary to replace the contact members. The present switch is capable of closing 20,000 amperes without damage to the contact members. Previously known grounding switches have required repair or replacement of the contact members after one closing operation at high current. Therefore, the high dielectric strength and the arc extinguishing properties of a gas, such as $SF_6$, are utilized to the best advantage in the present switch.

The details of structure of the insulating casing 30 and the contact members of the switch are shown more clearly in FIGS. 3, 4 and 5. As shown in FIG. 5, the porcelain sections of the insulator 30 are joined together by a metal ring 34 and clamping rings 35. The rings 35 are cemented to the porcelain sections by a suitable cement 36. The rings 35 are drawn together by bolts 37, thereby compressing the porcelain sections against gaskets 38 disposed between the porcelain sections and the metal ring 34.

A similar scheme is utilized to attach the lower porcelain section 31 to an adapter plate 41 which is attached to a mounting plate 42 secured to the top of the metal enclosure 28. Likewise, the upper porcelain section 33 is attached to an adapter plate 43. A cover plate 44 is removably attached to the adapter plate 43 by screws 45.

Fixed contact members 46 are secured to the lower end of a metal tube 47, the upper end of which is secured to a flat ring 48. The ring 48 is adjustably clamped to the lower side of the adapter plate 43 by a clamping plate 49 and bolts 51. Thus, the contact members 46 may be aligned with the moving contact member by shifting the ring 48 and then held in the proper position by tightening the bolts 51. As a further precaution against movement of the contact members 46 after they are properly aligned, set screws 52 are dowelled into the ring 48 which is secured to the tube 47.

A moving contact member 53 is attached to the upper end of a contact rod 54 which is slidably disposed in a metal tube 55. The movable contact rod 54 is preferably made of a light-weight metal such as aluminum or one of its alloys, so that it may be rapidly accelerated during its closing movement. The tube 55 has a flange 56 at its lower end which is attached to the adapter plate 41 by means of bolts 57. A corona shield 58 is attached to the lower end of the tube 47. A similar corona shield 59 is attached to the upper end of the tube 55. The shield 59 has an opening 61 therein through which the contact member 53 and the contact rod 54 pass during closing of the switch. As shown in FIG. 4, the corona shield 58 has an opening 62 therein through which the contact member 53 passes during closing. Thus, both corona shields 58 and 59 remain fixed in position and are spaced sufficiently far apart to prevent arcing between the shields when the switch is open. Likewise, the movable contact member 53 is spaced from the fixed contact members 46 to prevent flashover between the contact members. However, as previously explained, the distance required to prevent flashover is decreased by utilizing the pressurized $SF_6$ gas.

As previously stated, the contact rod 54 moves longitudinally in the tube 55. As shown in FIGS. 3 and 4, a piston member 63 is attached to the rod 54 by means of a pin 64. The piston 63 slides inside the tube 55 and may be provided with rings 65. Thus, the member 63 functions in a manner similar to a piston inside a cylinder. A guide and seal 66 is provided at the upper end of the tube 55. The member 66 is composed of a low friction material and is retained in place by means of the corona shield 59 which may be threaded onto the outside of the tube 55.

As shown in FIG. 4, a plurality of vent holes 67 are provided in the tube 55 a short distance below the upper end of the tube. Thus, the gas which is inside the tube 55 is permitted to escape through the vent holes 67 as the piston 63 moves upwardly until the piston 63 passes the vent holes 67. Further upward movement of the piston 63 compresses the gas inside the upper end of the tube 55, thereby cushioning the upward movement of the rod 54 and the contact member 53. The rod 54, when in the open position, is biased upwardly by an accelerating spring 68 which surrounds the rod 54 and is disposed inside the tube 55 between a collar 69 and the adapter plate 41. The spring 68 is a strong one and is compressed when the rod 54 is in its lowermost position for the purpose of giving initial acceleration to the movable contact rod in closing. Final closing movement is accomplished by the spring of the operating mechanism described hereafter.

Figure 7:
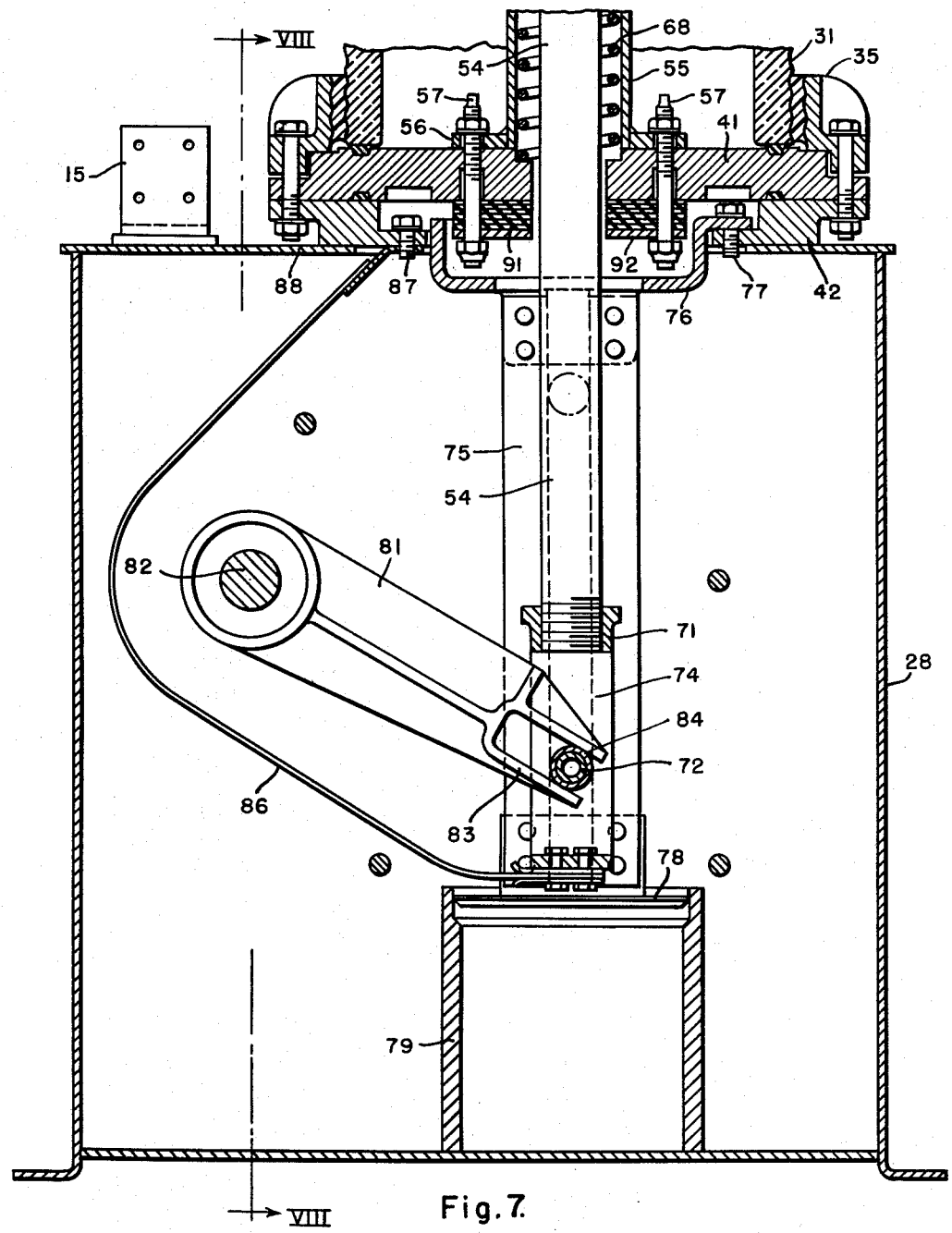
FIG. 7 is an enlarged view, partly in section and partly in elevation, the section being taken along the line VII—VII in FIG. 3 and showing part of the operating mechanism.

As shown in FIGS. 3 and 7, the lower end of the contact rod 54 is threaded into the upper end of a support 71. A bearing shaft 72 extends transversely through the support 71. Roller bearings 73 are provided at the ends of the shaft 72. These bearings move vertically in slots 74 provided in a guide support 75. The upper end of the guide support 75 is attached to a flanged support 76 which, in turn, is attached to the mounting plate 42 by means of screws 77. The lower end of the guide support 75 is attached to a flat disc 78 which is disposed in a cylindrical guide tube 79 secured to the bottom of the enclosure 28.

As shown in FIG. 7, an operating lever 81, which is secured to an operating shaft 82, has a forked or bifurcated end 83 which straddles the bearing shaft 72. A roller bearing 84 is mounted on the shaft 72 between the spaced ends 83 of the lever 81. Thus, the contact rod 54 may be moved downwardly by moving the lever 81 in a clockwise direction as shown in FIG. 7. The lever 81 is actuated by the shaft 82 in a manner which will be described more fully hereinafter. As previously explained, the contact rod 54 is moved upwardly by the accelerating spring 68 when a latching mechanism is released in a manner which will be described hereinafter.

As shown in FIG. 3, the bearing shaft 72 is insulated from the support 71 by means of insulating sleeves 85. Thus, current is prevented from flowing through the bearing members on the bearing shaft 72. As shown in FIG. 7, a flexible shunt 86 is attached to the lower end of the support 71, the upper end of which is threaded onto the contact rod 54. The upper end of the flexible shunt 86 is attached to the mounting plate 42 by means of a screw 87. As previously explained, a ground terminal 15 is attached to the top cover 88 of the enclosure 28 to which the mounting plate 42 is secured. Thus, when the moving contact 53 engages the fixed contact members 46, a circuit is established through the switch from the upper terminal 12 through the top cover plate 44, the contact support tube 47, the fixed contacts 46, the movable contact 53, the contact rod 54, the support 71, the flexible shunt 86, the mounting plate 42 and the top cover plate 88 to the lower terminal 15. No appreciable current normally flows through the switch when it is standing in closed position, since it is a grounding device, and no arc is drawn and no arc-extinguishing structure is needed for the opening operation.

As shown in FIGS. 3 and 7, a plurality of sheets 91 composed of resilient material, such as rubber, are mounted at the lower side of the adapter plate 41 on the bolts 57 which also attach the tube 55 to the upper side of the adapter 41. A metal plate 92 is mounted on the bolts 57 below the resilient sheets 91. When the contact rod 54 moves upwardly, the upper end of the support 71 engages the metal plate 92, thereby causing the resilient sheets 91 to function as a buffer for the upwardly moving contact assembly. As previously explained, the gas which is compressed between the piston member 63 and the sealed upper end of the tube 55 also retards the upward movement of the contact assembly at the upper end of its travel and gives a shock-absorbing action.

As shown in FIG. 6, the latching mechanism for retaining the contact rod 54 in its lowermost position, in which position the spring 68 is compressed, comprises a latch 95 pivotally supported by means of a pin 96 on a bell crank lever 97 which is pivoted on a fixed pivot 98 in a frame member 99. The lever 97 carries a latch roller 101 which is engaged by a trigger latch 102 pivoted on a pin 103. The latch 95 and the lever 97 form an underset toggle which is biased by a spring 104 to a reset position, but is prevented from collapsing by a component of the force of the accelerating spring 68 applied to the shaft 82 and a latch lever 105 which is secured to the end of the operating shaft 82. The latch 95 is provided with a shoulder 106 which normally engages a shoulder 107 on the latch lever 105 to restrain the latter in the position shown in FIG. 6.

When an electromagnet 108 is energized by the operation of the differential relays, as previously explained, a solenoid plunger 109 is moved upwardly to disengage the trigger latch 102 from the roller 101. This releases the bell-crank lever 97 which is immediately actuated counterclockwise about its pivot 98 by the force applied through the latch lever 105. The movement of the bell crank 97 is limited by a stop stud 111. As the lever 97 moves counterclockwise, a nose 112 on the end of the latch 95 engages a surface 113 on the latch lever 105 and pries the latch 95 out of engagement with the latch lever 105. This releases the latch lever 105 and the force of the accelerating spring 68 initiates the closing of the contact members of the switch and also rotates the operating shaft 82.

As soon as the latch 95 is free of the latch lever 105, the spring 104 actuates the bell crank 97 clockwise against the stop stud 111. The trigger latch 102 is biased clockwise by means of a spring 114 provided the electromagnet 108 is deenergized. Thus, the latching mechanism is in position for resetting of the latch lever 105 and the contact actuating mechanism.

As shown in FIG. 8, the main operating shaft 82 is rotatably mounted in the enclosure 28 on roller bearings 115 and 116. As previously stated, the operating lever 81 is secured to the shaft 82 by means of a pin 117. The bearing 115 is mounted in a bearing support 118 which is attached to a supporting member 119 by means of bolts 121 and 122. The member 119 is secured in an opening in an inner wall 123 of the enclosure 28. A gasket 124 is provided between the members 118 and 119.

The bearing 116 is mounted in a spacer 125 which is disposed inside a bearing support 126 secured in an opening in an inner wall 127 of the enclosure 28. A gasket 128 which spans the joint between the members 125 and 126 is held in position by means of a clamping member 129 which is attached to the support 126 by bolts 131.

The bearing 116 is retained in the spacer 125 by means of a nut 132 which is threaded into the spacer 125.

The compressed gas is prevented from escaping from an inner compartment 133 of the enclosure 28 by means of flexible seals 134 which may be of the type described in a copending application of C. W. Upton, Serial No. 497,524, filed March 29, 1955 which was issued September 23, 1958 as U.S. Patent 2,853,584. As shown, one end of each flexible seal 134 is clamped to the shaft 82 at opposite sides of the hub of the lever 81 by means of clamping members 135 and bolts 136. The other end of one flexible seal 134 is clamped to the spacer 125 by similar clamping members 135. The other end of the other flexible seal 134 is clamped to the bearing support 118 by similar clamping member 135. Resilient rings 137 are disposed between the seals 134 and the spacer 125 or the bearing support 118. Similar resilient rings 138 are disposed between the flexible seals 134 and the shaft 82. In this manner, an effective seal is provided which prevents gas from escaping around the shaft 82. Thus, the device of this invention is sealed off and does not require permanent connection to a source of gas under pressure or to an air compressor, as is the case with compressed air circuit breakers.

As shown in FIG. 8, the left-hand end of the shaft 82 is secured to a sleeve 141 by means of a pin 142. A latch plate 143 is secured to the sleeve 141. A hollow shaft 144 is rotatably mounted in a sleeve bearing 145 which is supported in a bearing support 146 attached to the end wall of the enclosure 28 by means of bolts 147. The inner end of the hollow shaft 144 overlaps the sleeve 141 and a sleeve bearing 148 is disposed between these two members. An operating handle 149 is secured to the outer end of the hollow shaft 144.

An indicating shaft 151 is rotatably mounted inside the hollow shaft 144. The shaft 151 is supported by sleeve bearings 152 and 153. The bearing 153 is mounted in the left-hand end of the main shaft 82. The bearing 152 is mounted in the outer end of the hollow shaft 144. A pointer or indicator 154 is secured to the outer end of the indicating shaft 151. As shown in FIG. 1, the indicator 154 indicates whether the contact members of the grounding switch are open or closed. An indicating plate 155 is attached to the outside of the enclosure 28.

Figure 9:
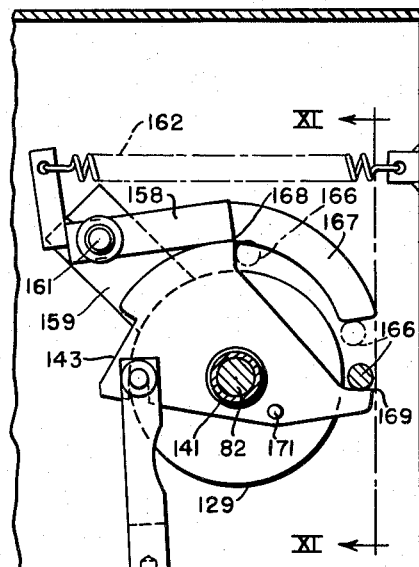
FIG. 9 is an enlarged view, partly in section and partly in elevation, the section being taken along the line IX—IX in FIG. 8 and showing the anti-rebound mechanism with the switch open.

As shown in FIG. 9, a spring 156 surrounds a guide member 157, the upper end of which is attached to the latch plate 143. When the contact members of the switch are open, the spring 156 is compressed as shown in FIG. 9. As previously explained, the accelerating spring 68 is also compressed when the contact members of the switch are open. The spring 68 has a relatively short travel and accelerates the movable contact member very rapidly. The spring 156 provides driving forces throughout the travel of the movable contact member 53. The force of the spring 156 is released when the latch mechanism previously described is released.

In order to prevent the contact members of the switch from rebounding to an open position during the closing operation, an anti-rebound latch 158 is pivotally mounted on a support 159 which is secured to the support member 126 attached to the wall 127 of the enclosure 28. The anti-rebound latch 158 is biased in a clockwise direction about its pivotal support 161 by means of a tension spring 162. When the contact members of the switch are closed, the latch plate 143 is in the position shown in FIG. 10 and a shoulder 163 on the latch 158 engages a shoulder 164 on the latch plate 143, thereby retaining the contact members in the closed position and preventing a rebounding of the contact members.

Figure 10:
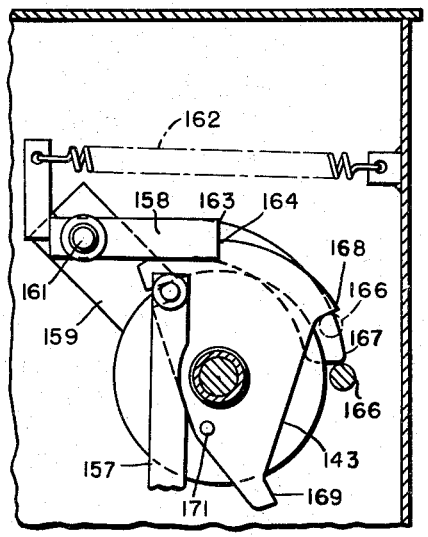
FIG. 10 is a view similar to FIG. 9, showing the anti-rebound mechanism with the switch closed.
Figure 11:
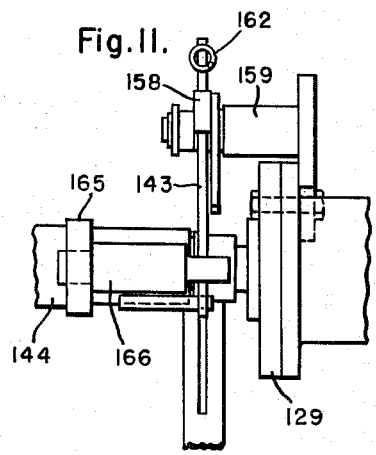
FIG. 11 is a detail view taken along the line XI—XI in FIG. 9 and looking in the direction of the arrows.

The switch may be reset with the contact members in the open position by means of the operating handle 149 which is secured to the hollow shaft 144. As shown in FIGS. 8 and 11, an arm 165 is secured to the outside of the hollow shaft 144. A pin 166 is secured to the arm 165 and extends parallel to the shaft 144. As shown in FIGS. 9, 10 and 11, one end of the pin 166, which is reduced in size, extends past the latch plate 143 and is disposed to engage shoulders on the latch plate. As shown in FIG. 10, the pin 166 is also disposed to engage the end of an extension 167 on the anti-rebound latch 158.

Thus, when the shaft 144 is rotated by means of the handle 149, the pin 166 engages the extension 167 to raise the latch 158, thereby disengaging the latch from the shoulder 164 on the latch plate 143. When the pin 166 moves to the position shown by the broken lines in FIG. 10, the latch 158 is released and the pin 166 engages a shoulder 168 on the latch plate 143, thereby rotating the plate in a counterclockwise direction, as viewed in FIG. 10, to the position shown in FIG. 9 which is the open position of the switch.

As previously explained, the latch plate 143 is secured to the sleeve 141 which, in turn, is secured to the operating shaft 82. Thus, the shaft 82 is rotated as the handle 149 is rotated. The accelerating spring 68 and the spring 156 are both compressed during opening of the contact members of the switch. As previously explained, the contact members are retained in the open position by the latching mechanism which engages the latch lever 105 secured to the one end of the operating shaft 82. Thus, the switch is retained in the open position until the latching mechanism is released in the manner previously described.

After the latching mechanism is reset, the operating handle 149 is returned to a position in which the pin 166 is in the position shown in FIG. 9, in which it engages a shoulder 169 on the latch plate 143. In this manner, the pin 166 is disengaged from the shoulder 168, thereby leaving the latch plate 143 free to move to the closed position when the tripping mechanism of the switch is actuated. Thus, the hollow shaft 144 and the pin 166 constitute a lost-motion connection between the operating handle 149 and the latch plate 143 which is secured to the operating shaft 82.

As shown in FIGS. 8, 9 and 10, a pin 171 is secured to the latch plate 143. This pin is disposed to engage an arm 172 which is secured to the indicator shaft 151. The pin 171 drives the shaft 151 in one direction as the latch plate 143 is rotated. Thus, the indicating pointer 154 is moved with reference to the indicating plate 155 to provide an indication of the position of the contact members of the switch. The indicating shaft is actuated in the other direction by means of a spring 173, one end of which is secured to the arm 172 as shown in FIG. 8.

As shown in FIG. 6, two pressure-responsive relays or switches 176 and 177 are mounted at one end of the enclosure 28. These relays are connected by means of pipes 178 and 179, respectively, to the interior of the enclosure which is filled with the $SF_6$ gas. Thus, the relays are responsive to the pressure of the gas inside the enclosure. The normal operating pressure of the gas in the present switch may be 30 pounds per square inch. However, the switch can be safely operated at approximately half the normal pressure such as at 13 to 15 pounds per square inch.

In order to prevent unnecessary application of a short circuit on the system when there is no transformer fault but only low pressure in the grounding switch resulting from molecular diffusion of gas through materials over an extended period of time, one relay, for example the relay 176, is set to operate when the pressure is reduced to 15 pounds per square inch. The contact members of this relay may be connected through terminal blocks 181 to the tripping mechanism for the low-voltage circuit breaker shown in FIG. 2, thereby opening this circuit breaker. The relay 176 is also connected to the motor operated mechanism for the disconnect switch shown in FIG. 2, thereby opening the disconnect switch after the low-voltage circuit breaker is opened to remove the load from the transformer.

As previously explained, the motor operated disconnect switch may be of a type capable of interrupting the charging current in the transmission line. In this manner, the high-speed grounding switch is isolated and a recharging operation may be performed to restore the gas pressure. It will be noted that in this case the high-speed grounding switch has not been closed to ground the transmission line while it is carrying the load current. It will also be noted that the relay 176 is set to operate while the pressure inside the switch is within the safe operating range for the switch. Thus, in case of a fault in the transformer bank the grounding switch would be operated in the normal manner to ground the transmission line to cause the opening of the high-speed circuit breaker.

In the event of a rapid drop in the gas pressure within the switch, the relay 177, which may be set to operate at a lower pressure such as 13 pounds pressure, functions to cause energization of the tripping solenoid 108, thereby operating the tripping mechanism to close the contact members of the grounding switch which grounds the transmission line and causes opening of the high speed circuit breaker in the manner previously described. Thus, the grounding switch is protected against damage resulting from operation at a gas pressure below the safe operating pressure. It will be understood that only one pressure-responsive relay may be utilized to make the grounding switch fail safe. Thus, the relay which controls the motor operated disconnect switch may be omitted, if desired.

From the foregoing description it is apparent that we have provided an enclosed grounding switch of the reciprocating type which is capable of closing within five cycles from the time of energization of the closing coil of the switch. The utilization of the sulphur hexafluoride, or similar, gas of high dielectric strength permits the contact members of the switch to be spaced relatively close together when in the open position, thereby decreasing the time required for operation. The utilization of a longitudinally-movable reciprocating contact member also increases the speed of operation. The gas also decreases arcing during closing of the contact members, thereby minimizing contact burning which permits repetitive operation of the switch without maintenance. Furthermore, the switch is not susceptible to icing since the contact members and other moving parts of the switch are enclosed.

Since numerous changes may be made in the above-described construction and different embodiments of the invention may be made without departing from the spirit and scope thereof, it is intended that all the matter contained in the foregoing description or shown in the accompanying drawings shall be interpreted as illustrative and not in a limiting sense.

We claim as our invention:
1. In an electric switch, in combination, a metal enclosure, an insulating casing mounted above the enclosure, a cylindrical tube inside the casing, a reciprocating contact member extending from the enclosure into the tube, a fixed contact member disposed in the casing and normally spaced from the reciprocating contact member, energy storing means in the casing for actuating the reciprocating contact member into engagement with the fixed contact member, additional energy storing means in the enclosure cooperating with the means in the casing during the closing of said contact members, a seal at the top of said tube, said reciprocating contact member passing through said seal, vent means in the tube, a piston in the tube movable with the reciprocating contact member, said piston being below said vent means during the first part of the closing operation and above the vent means during the latter part of the closing operation, operating means in the enclosure for withdrawing the reciprocating contact member from engagement with the fixed contact member and energizing both of the energy storing means, a gas retained in said casing and said enclosure, said gas having a dielectric strength of at least 1.4 times that of air for reducing the distance required between said contact members to prevent arcing at a predetermined voltage while the contact members are separated, and said gas having arc-extinguishing properties to reduce arcing between the contact members while they are being closed under load.

2. In a normally open grounding switch, in combination, a metal enclosure at ground potential, a generally cylindrical insulating casing mounted on the enclosure, a fixed contact member supported inside the casing, a cylindrical tube disposed inside the casing, a reciprocating contact member movable longitudinally inside the tube and normally spaced from the fixed contact member, a spring disposed in the casing for actuating the reciprocating contact member into engagement with the fixed contact member to ground the fixed contact member, an additional spring disposed in the enclosure and cooperating with the spring in the casing during the closing of said contact members, a seal at the top of said tube, said reciprocating contact member passing through said seal, vent means in the tube, a piston in the tube movable with the reciprocating contact member, said piston being below said vent means during the first part of the closing operation and above the vent means during the latter part of the closing operation, operating means in the enclosure for withdrawing the reciprocating contact member from engagement with the fixed contact member and compressing said springs, sulphur hexafluoride gas retained in said casing and said enclosure, said gas having a high dielectric strength to prevent arcing while the contact members are separated, and said gas having arc-extinguishing properties to reduce arcing between the contact members while they are being closed under load.

3. In an electric switch, in combination, a metal enclosure at ground potential, a generally cylindrical insulating casing mounted above the enclosure, a fixed contact member supported at the top of the casing and disposed inside the casing, a reciprocating contact member normally spaced from the fixed contact member, a spring surrounding the reciprocating contact member for actuating the reciprocating contact member into engagement with the fixed contact member to ground the fixed contact member, an operating shaft rotatably mounted in the enclosure, an operating lever secured to the shaft and pivotally engaging the reciprocating contact member for withdrawing it from engagement with the fixed contact member and compressing said spring, a plate secured to the shaft, a rotatable sleeve coaxial with the shaft and extending to the outside of the enclosure, operating means disposed outside the enclosure for rotating the sleeve, and lost-motion means connecting the sleeve to the plate.

4. In an electric switch, in combination, a metal enclosure, an insulating casing mounted above the enclosure, a cylindrical tube disposed inside the casing, a stationary conducting member in the casing, a movable conducting member slidably disposed in the tube, spring means for moving the movable conducting member into electrical contact with the stationary conducting member, mechanical operating means in the enclosure for compressing said spring means, latch means for retaining said spring means under compression, tripping means for releasing said latch means, said movable conducting member being disposed to make contact with the stationary conducting member within five cycles from the time of energizing said tripping means, a spring-biased anti-rebound latch for retaining said conducting members in engagement, and said latch being released by said operating means.

5. In an electric switch, in combination, a metal enclosure, an insulating casing mounted above the enclosure, a cylindrical tube disposed inside the casing, a stationary conducting member in the casing, a movable conducting member slidably disposed in the tube, spring means for moving the movable conducting member into electrical contact with the stationary conducting member, an operating shaft rotatably mounted in the enclosure, lever means actuated by the shaft for compressing said spring means, actuating means outside the enclosure for rotating the shaft, latch means for retaining said spring means under compression, tripping means for releasing said latch means, said movable conducting member being disposed sufficiently close to the stationary conducting member to make contact with the stationary conducting member within five cycles from the time of energizing said tripping means, a latch plate secured to the shaft, and an anti-rebound latch for engaging said latch plate to prevent rebounding of the movable conducting member.

6. In an electric switch, in combination, a metal enclosure, an insulating casing mounted above the enclosure, a fixed contact member supported at the top of the casing and disposed inside the casing, a corona shield enclosing said contact member and having an opening in the bottom of the shield, a cylindrical tube disposed inside the casing and supported at the bottom of the casing, a corona shield mounted on the upper end of said tube and having an opening in the top of the shield, the shield of the tube being spaced from the shield enclosing the fixed contact member, a reciprocating contact member disposed inside the tube, a first spring disposed inside the casing for actuating the reciprocating contact member through the openings in said shields into engagement with the fixed contact member, an operating shaft rotatably mounted in the enclosure, a second spring attached to said shaft to cooperate with the first spring, an operating lever secured to the shaft and pivotally engaging the reciprocating contact member for withdrawing it from engagement with the fixed contact member and compressing said springs, operating means for rotating the shaft, and lost motion means connecting the operating means to the shaft.

7. In an electric switch, in combination, a metal enclosure, an insulating casing mounted above the enclosure, a fixed contact member supported at the top of the casing and disposed inside the casing, a corona shield enclosing said contact member and having an opening in the bottom of the shield, a cylindrical tube disposed inside the casing and supported at the bottom of the casing, a corona shield mounted on the upper end of said tube and having an opening in the top of the shield, the shield on the tube being spaced from the shield enclosing the fixed contact member, a reciprocating contact member disposed inside the tube, a spring for actuating the reciprocating contact member through the openings in said shields into engagement with the fixed contact member, an anti-rebound latch for retaining said contact members in engagement, operating means for releasing said latch and withdrawing the reciprocating contact member from engagement with the fixed contact and compressing said spring, latch means for retaining the spring under compression, and trip means for releasing said latch means.

8. In an electric switch, in combination, a metal enclosure, an insulating casing mounted above the enclosure, a fixed contact member supported at the top of the casing and disposed inside the casing, a corona shield enclosing said contact member and having an opening in the bottom of the shield, a cylindrical tube disposed inside the casing and supported at the bottom of the casing, a corona shield mounted on the upper end of said tube and having an opening in the top of the shield, the shield on the tube being spaced from the shield enclosing the fixed contact member, a reciprocating contact member disposed inside the tube, a spring for actuating the reciprocating contact member through the openings in said shields into engagement with the fixed contact member, a spring-biased anti-rebound latch for retaining said contact members in engagement, operating means movable in one direction first to release said latch and then to withdraw the reciprocating contact member from engagement with the fixed contact member and compress said spring, latch means for retaining the spring under compression, and tripping means for releasing said latch means.

9. In an electric switch, in combination, a metal enclosure, an insulating casing mounted above the enclosure, a cylindrical tube disposed inside the casing, a stationary conducting member in the casing, a movable conducting member slidably disposed in the tube, spring means for moving the movable conducting member into electrical contact with the stationary conducting member, operating means in the enclosure for compressing said spring means, latch means for retaining said spring means under compression, trip means for releasing said latch means, a seal at the top of said tube, said movable conducting member passing through said seal, vent means in the tube, and a piston in the tube movable with the movable conducting member, said piston being below said vent means during the first part of the closing operation and above said vent means during the latter part of the closing operation.

10. A grounding switch comprising a generally cylindrical insulating casing, a fixed contact member disposed inside the casing, a reciprocating contact member normally spaced from the fixed contact member, energy storing means disposed in the casing for actuating the reciprocating contact member into engagement with the fixed contact member, a rotatable shaft for actuating the reciprocating contact member, additional energy storing means for driving said shaft and cooperating with the means in the casing during closing of said contact members, and a gas retained in said casing, said gas having a dielectric strength of at least 1.4 times that of air for decreasing the distance necessary between said contact members to prevent arcing at a predetermined voltage, thereby reducing the time required to close said contact members.

11. A grounding switch comprising a generally cylindrical insulating casing, a fixed contact member disposed inside the casing, a reciprocating contact member normally spaced from the fixed contact member, energy storing means disposed in the casing for actuating the reciprocating contact member into engagement with the fixed contact member, a rotatable shaft for also actuating the reciprocating contact member, additional energy storing means for driving said shaft and cooperating with the means in the casing during closing of said contact members, and sulphur hexafluoride gas retained in said casing at a pressure above atmospheric pressure for decreasing the distance necessary between the contact members to prevent arcing at a predetermined voltage, thereby reducing the time required to close said contact members.

12. In a switchgear structure in combination, a high speed grounding switch having one terminal electrically connected to a transmission line of a predetermined voltage and another terminal electrically connected to ground, said switch having normally open contact members enclosed in an insulating housing, said contact members being spaced a sufficient distance to withstand the line to ground voltage, a first spring means disposed inside the housing for closing said contact members, a second spring means disposed externally of the housing for also closing said contact members, rotatable means for causing cooperation between said first and second spring means, latch means for retaining said contact members open, tripping means for releasing said latch means, and sulphur hexafluoride gas retained in said housing for decreasing the distance necessary between the contact members to prevent arcing at the line to ground voltage, thereby reducing the time required to close said contact members and ground the transmission line.

References Cited in the file of this patent

UNITED STATES PATENTS

| | | |
|---|---|---|
| 1,378,557 | Pragst | May 17, 1921 |
| 1,751,222 | Styer | Mar. 18, 1930 |
| 2,153,400 | Trencham | Apr. 4, 1939 |
| 2,221,671 | Cooper | Nov. 12, 1940 |
| 2,221,672 | Cooper | Nov. 12, 1940 |
| 2,278,971 | Boehne | Apr. 7, 1942 |
| 2,298,859 | Allan et al. | Oct. 13, 1942 |
| 2,491,112 | Jansson | Dec. 13, 1949 |
| 2,572,637 | Lincks | Oct. 23, 1951 |
| 2,600,304 | Krida | June 10, 1952 |
| 2,669,622 | Owens | Feb. 16, 1954 |
| 2,669,629 | MacNeill et al. | Feb. 16, 1954 |
| 2,733,316 | Browne | Jan. 31, 1956 |
| 2,757,261 | Lingal | July 31, 1956 |
| 2,766,348 | Forwald | Oct. 9, 1956 |
| 2,788,418 | Owens | Apr. 9, 1957 |

FOREIGN PATENTS

| | | |
|---|---|---|
| 432,453 | Great Britain | July 25, 1935 |
| 662,216 | Germany | July 7, 1938 |